United States Patent Office 3,337,582
Patented Aug. 22, 1967

3,337,582
ANTHRAQUINONE VAT DYESTUFFS
Hans Altermatt, Reinach, Basel-Land, Switzerland, assignor to Ciba Limited, Basel, Switzerland, a company of Switzerland
No Drawing. Filed July 17, 1964, Ser. No. 383,523
Claims priority, application Switzerland, Aug. 26, 1963, 10,512/63
8 Claims. (Cl. 260—316)

The present invention provides new, valuable anthraquinoid vat dyestuffs of the formula

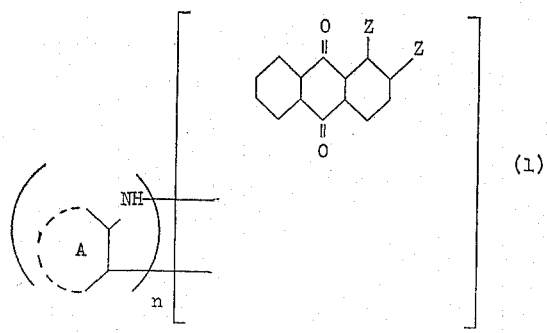

in which A represents a benzene or naphthalene ring, $n$ represents 1 or 2, one Z represents a hydrogen atom and the other Z represents a group of the formula

—NH—R$_1$—NH—X (in which R$_1$ represents the radical of a carboxylic acid which is at least dibasic and X represents a vattable anthraquinone radical) and in which at least one sulfonic acid group or carboxylic acid group is present in the radical A or in another external aryl nucleus, that is to say, a nucleus not forming part of a trinuclear 9:10-dioxanthracene structure, and the radical

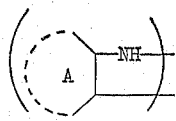

is bound in ortho-position through both valencies to the same six-membered ring of the anthraquinone radical.

The term "vat dyestuffs" and "vattable" radicals include those dyestuffs and radicals that can be converted by reduction into a so-called leuco form or vat which has better affinity for natural or regenerated cellulose fibers than the unreduced form and which can be re-converted into the original chromophoric system by oxidation. The abovementioned vat dyestuffs contain two anthraquinone radicals. In addition to the carbazole grouping and the sulfonic acid and/or carboxylic acid group, the dyestuffs of the invention may contain the substituents usually present in vat dyestuffs (for example, halogen atoms and alkyl or alkoxy groups) and also reactive substituents (for example, sulfato or thiosulfato groups, eliminable halogen atoms, epoxy radicals, pyrimidine or triazine rings containing phenoxy, anilido or mercapto groups, ethyleneimine groupings and the like).

The dyestuffs of the invention are advantageously obtained by the sulfonation and/or carbazolization of acylaminoanthraquinones, which are obtained, for example, by condensing 2 mols of an aminoanthraquinone, for example, 1-amino-3-, 4-, 5- or 6-phenyl- or naphthylaminoanthraquinone or of the corresponding sulfophenyl or sulfonaphthyl compounds, or 1 mol of such an aminoanthraquinone and 1 mol of another aminoanthraquinone, for example, 1-amino-4- or 5-benzoyl-aminoanthraquinone with an acid chloride of a carboxylic acid that is at least dibasic. Such acids may be heterocyclic, but, above all, aliphatic or especially aromatic polybasic carboxylic acids, for example, oxalic acid, succinic acid, glutaric acid, phthalic acid, isophthalic acid, terephthalic acid, azobenzene-dicarboxylic acid, azodiphenyl-dicarboxylic acid, perylenetetracarboxylic acid, dianilide-dicarboxylic acid, anthanthrone-dicarboxylic acid, furane-dicarboxylic acid and thiophene-dicarboxylic acid. Examples of acid chlorides of polybasic acids are listed in the table in Example 1.

As has already been mentioned, the vat dyestuffs of the invention are advantageously obtained by introducing a sulfonic acid group into the aforementioned acylaminoanthraquinones, if the said acylamino-anthraquinones correspond to the Formula 1 but do not contain a sulfonic acid group, or by carbazolization of an acylaminoanthraquinone of the formula

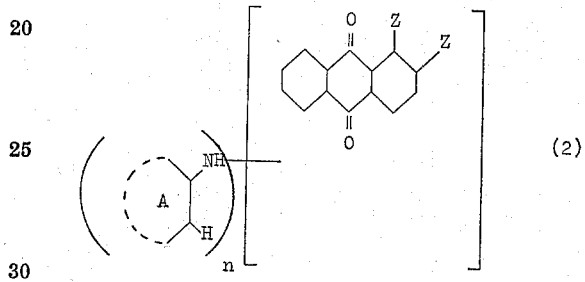

in which A, Z and $n$ have the meanings ascribed to them in Formula 1, or by simultaneous sulfonation and carbazolization.

The aminoanthraquinones containing a phenylamino group or naphthylamino group used in the preparation of the starting materials are obtained, for example, by reacting anthraquinones that contain an exchangeable substituent, for example, a halogen atom or a nitro group or a hydroxy group, with phenyl-amines or naphthylamines or with aniline sulfonic acids, naphthylamine sulfonic acids, phenylamino carboxylic acids or naphthylamine carboxylic acids. The said reaction may be carried out in the presence of an inert solvent or diluent with the application of heat, preferably at a temperature above 100° C., for example, at 115 to 180° C.

The preparation of the dyestuffs of the invention by sulfonation of unsulfonated acylaminoanthraquinones of the Formula 1 is advantageously carried out with oleum in the cold or at an elevated temperature. Preparation by carbazolization of acylaminoanthraquinones of the Formula 2, on the other hand, is advantageously effected by means of sulfuric acid of a strength not exceeding 95%; the use of slightly stronger sulfuric acid brings about virtual simultaneous sulfonation and carbazolization.

The vat dyestuffs of the invention may also be obtained by acylating by means of acylating agents anthraquinone dyestuffs containing at least two amino groups or dyestuff intermediate products containing at least two amino groups, which intermediates are convertible into anthraquinone vat dyestuffs by acylation of the amino groups, at least one of the anthraquinones being a derivative of a phthaloylcarbazole or a phthaloyl benzcarbazole containing at least one sulfonic acid group that is not bound to the anthracene structure.

As examples of acylatable vat dyestuffs or vat dyestuff intermediate products containing amino groups that are suitable for use as starting materials in the processes of the invention there may be mentioned, in particular, 2-aminoanthraquinones, but, above all, 1-aminoanthraquinones that contain a monoalkylated or especially a free —NH$_2$ group and, for example, in 3-, 4-, 5-, 6-, 7- or 8-position, an arylamino group, for example, an anilido, a chloranilido, an ortho-, meta- or para-methylanilido, a 2-naphthylamino or a 1-naphthylamino group, which groups may contain groups imparting solubility in water. The following are examples:

1-amino-4-(4'-methyl- or 4'-chlorophenylamino)-anthraquinone,
1-amino-5-(4'-methyl- or 3'-chlorophenylamino)-anthraquinone,
1:4-diamino-2:3-di-(phenylamino)-anthraquinone,
1-amino-4-phenylaminoanthraquinone,
2-amino-6-phenylaminoanthraquinone,
1-amino-5-phenylaminoanthraquinone,
1-amino-6-phenylaminoanthraquinone,
1-amino-8-phenylaminoanthraquinone,
1-amino-7-phenylaminoanthraquinone,
1-amino-4- or 5-(α- or β-naphthylamino)-anthraquinone,
1-amino-4- or 5-(β'-chloronaphthyl-[1']-amino)-anthraquinone,
1:5-diamino-4-phenylaminoanthraquinone,
1:4-diamino-5-phenylaminoanthraquinone,
1:5-diamino-4:8-diphenylaminoanthraquinone, and also corresponding derivatives containing carboxylic and/or sulfonic acid groups in the phenyl- or naphthyl-amino radical, for example, 1-amino-4-, 5- or 8-phenyl-aminoanthraquinone-3'- or 4'-sulfonic acid and 1-amino-4-, 5- or 8-phenylaminoanthraquinone-4'-carboxylic acid.

Examples of acylating agents that may be used are the carboxylic acid halides or the corresponding anhydrides that have already been mentioned.

Finally, another method of carrying out the acylation is to acylate dyestuffs of the Formula 1 that are free from sulfonic acid groups and contain a free amino group in the radical X with, for example, sulfobenzoic acid chloride or anhydride.

The reaction between the above-mentioned acylating agents and the arylaminoanthraquinones containing amino groups may be carried out in an inert organic solvent, for example, nitrobenzene, chlorobenzene at a raised temperature. In many cases it is also possible to carry out the reaction in an aqueous medium, advantageously in the presence of an agent capable of binding acid, for example, sodium acetate, sodium hydroxide or sodium carbonate. When starting materials are used that yield products containing at least one sulfonic acid group or carboxylic acid group bound to an external aromatic nucleus, the final operation is carbazolization. When using starting materials that are free from sulfonic acid and carboxylic acid groups the vat dyestuffs that are formed must be sulfonated in the usual manner after acylation in order to effect the introduction of one or more $SO_3H$ groups, in which case, as has already been mentioned, the carbazolization may be carried out simultaneously with or prior to sulfonation.

The vat dyestuffs of the invention are suitable for dyeing a very wide variety of materials, including synthetic and natural fibrous materials, for example, cellulose ethers and esters, polyesters (Terylene and Dacron), polyamides (nylon and the like), polyacrylonitriles (Orlon), polyurethanes, wool and silk. More especially, however, they are suitable for dyeing and printing textile materials made of natural or regenerated cellulose. Dyeing may be carried out by the so-called direct or exhaustion method, but the dyestuffs of the invention are particularly suitable for application by the pad-dyeing technique and in printing. Notwithstanding their solubility in water, the vat dyestuffs of the invention yield dyeings and prints on cellulosic fibers that are distinguished by a very good fastness to light and have excellent properties of wet fastness when applied by the usual vat-dyeing methods e.g. in the presence of an alkali and a reducing agent. Furthermore, the dyeings and prints are generally distinguished by their good level shades, good dyestuff penetration and a high degree of fastness to chlorine.

The dyeings and prints thus obtained are also fast to dry cleaning and migration. The colored fabrics may therefore be coated with synthetic resins, for example, polyvinyl chloride, without the dyestuff migration into the resin, which is specially important in the manufacture of artificial leather. Furthermore, the compounds of the invention are distinguished by the ease with which they can be vatted, which makes for economy and simplifies application.

The compounds of the invention that contain a fiber-reactive substituent may be fixed on wool and cellulose and the sulfoarylaminoanthraquinones having a lower molecular weight yield valuable dyeings and prints especially on wool, silk and polyamides.

As compared with the conventional vat dyestuffs, the vat dyestuffs of the invention possess a better levelling and penetrating power. When used for dyeing in circulating liquor machines they do not give rise to faulty dyeings caused by precipitation of re-oxidized dyestuff when foam is formed, and the pigmenting operation that is necessary in dyeing wound packages, for example, cheeses, or in dyeing tricots on a winch machine, with the conventional vat dyestuffs is not necessary with the dyestuffs of the invention. Moreover, they can be used in the form of solutions in fast-running pad-dyeing processes and do not have to be in the form of finely dispersed commercial preparations or in the form of special pastes, so that the disadvantages associated with such products (instability of the paste, dusting, and the need for one or more operations to prepare finely divided powders) do not arise. Finally they can generally be very easily vatted, often at room temperature, and, if desired or required, with mild reducing agents. They possess a very good solubility in the vat and yield, especially on regenerated cellulose, strong and very level dyeings that exhibit the same shades as the corresponding dyeings on cotton.

The following examples illustrate the invention. Unless otherwise stated, the parts and percentages are by weight; the relationship of parts by weight to parts by volume is the same as that of the gram to the milliliter.

*Example 1*

313 parts of 1-amino-5-anilido-anthraquinone and 102 parts of isophthalic acid dichloride were stirred for 3 hours at 150° C. in 2,000 parts by volume of trichlorobenzene, 5 parts by volume of thionyl chloride and 2 parts by volume of pyridine. After cooling, the reaction mixture was filtered, the filter residue washed thoroughly with methanol and the dyestuff thus obtained dried in vacuo at 70° C.

10 parts of the dry dyestuff were sprinkled into 100 parts by volume of 100% sulfuric acid (monohydrate) at room temperature. As soon as a neutralized test portion was soluble in water, the batch was discharged on to 300 parts of ice. The precipitate was isolated, suspended in an excess of dilute sodium hydroxide solution, sodium chloride added and the batch filtered. The dyestuff thus obtained corresponded to the formula

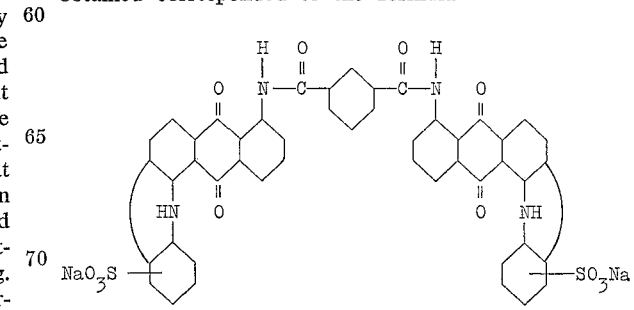

When applied according to the dyeing prescription given below (after Example 7) it dyed cotton yellow-brown tints possessing an excellent fastness to light and excellent properties of wet fastness.

Analogous dyestuffs were obtained when the 102 parts of isophthalic acid were replaced by the dicarboxylic acid dichlorides listed in Column I of the following table in the amounts (parts) shown in Column II, sulfonation and carbazolization being effected by stirring the batch in 100% sulfuric acid.

| I<br>Dicarboxylic acid dichloride | II<br>Parts |
|---|---|
| Cl–CO–CO–Cl (oxalyl chloride) | 63.5 |
| Cl–CO–CH$_2$–CH$_2$–CO–Cl | 77.5 |
| Cl–CO–C≡C–CO–Cl | 75.5 |
| Cl–CO–(cyclohexyl)–CO–Cl | 102 |
| Cl–CO–(decalin)–CO–Cl | 126 |
| Cl–CO–(cyclohexyl)–(cyclohexyl)–CO–Cl | 140 |
| Cl–CO–(cyclohexyl)–S–(cyclohexyl)–CO–Cl | 156 |
| Cl–CO–(cyclohexyl)–O–(cyclohexyl)–CO–Cl | 148 |
| Cl–CO–(cyclohexyl)–CH$_2$–(cyclohexyl)–CO–Cl | 147 |
| Cl–CO–(cyclohexyl)–NH–(cyclohexyl)–CO–Cl | 148 |
| (cyclohexyl–CO–Cl)–N=N–(cyclohexyl–CO–Cl) | 153 |
| Cl–CO–(cyclohexyl)–(cyclohexyl)–N=N–(cyclohexyl)–(cyclohexyl)–CO–Cl | 229 |
| Cl–CO–(cyclohexyl)–(oxadiazole)–(cyclohexyl)–CO–Cl | 217 |
| Cl–CO–(thiophene)–CO–Cl | 158 |
| Cl–CO–(pyridine)–CO–Cl | 146 |
| Cl–CO–(thianthrene)–CO–Cl | 170 |
| Cl–CO–(dioxin)–CO–Cl | 154 |

The 1-amino-5-anilidoanthraquinone could be replaced by one of the anthraquinones listed below, whereby dyestuffs having similar properties were obtained:

1-amino-3- or 4-anilido-anthraquinone,
1-amino-6-anilido-anthraquinone,
1-amino-7- or 8-anilido-anthraquinone,
2-amino-5-anilido-anthraquinone,
2-amino-6-anilido-anthraquinone,
1-amino-5-(para-methylanilido)-anthraquinone,
1-amino-5-(ortho-chloranilido)-anthraquinone,
1-amino-4-(1′-naphthylamino)-anthraquinone,
1-amino-4-(2′-naphthylamino)-anthraquinone,
1-amino-5-(2′-naphthylamino)-anthraquinone.

The acid chloride could be first made in the same reaction vessel and used without isolation as described in the following Example 2.

Example 2

8.4 parts of isophthalic acid and 8 parts by volume of thionyl chloride were stirred for half an hour at 120° C. in 150 parts by volume of dry nitrobenzene in the presence of 0.5 part of pyridine. The solution was cooled to 80° C., 31.4 parts of 1-amino-4-phenylaminoanthraquinone were added and stirring continued for a further 3 hours at 150° C. After cooling, the reaction mixture was filtered, the residue washed thoroughly with methanol and then dried in vacuo at 70° C.

10 parts of the dyestuff so prepared were introduced at room temperature into 100 parts by volume of 100% sulfuric acid (monohydrate). After 2 hours the batch was discharged on to 400 parts of ice, the residue washed with dilute sodium chloride solution and then dried. The violet, water-soluble dyestuff of the formula

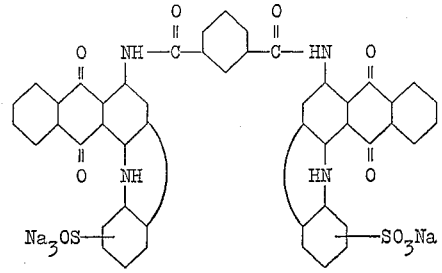

thus obtained dyed cotton fast claret tints when applied by the vat dyeing method.

Example 3

43 parts of 2:5-thiophene-dicarboxylic acid and 150 parts by volume of thionyl chloride were stirred for ½ hour at 130° C. in 2,000 parts by volume of trichlorobenzene in the presence of 0.5 part of pyridine. The excess thionyl chloride was distilled off, 79 parts of 1-amino-4-anilidoanthraquinone were added to the acid chloride solution and the whole stirred for 1½ hours at 160° C. 63 parts of 1-amino-4-methoxyanthraquinone were then introduced and the batch stirred for 2½ hours at 160° C. After cooling the reaction mixture the dark red dyestuff was isolated by filtration, washed with a small amount of trichlorobenzene and then thoroughly with methanol, after which it was dried in vacuo at 70° C.

10 parts of the dry dyestuff were stirred into 100 parts by volume of monohydrate. As soon as a neutralized test portion was soluble in water, the batch was discharged on to ice, the precipitate isolated and then suspended in a dilute sodium hydroxide solution. The dyestuff of the formula

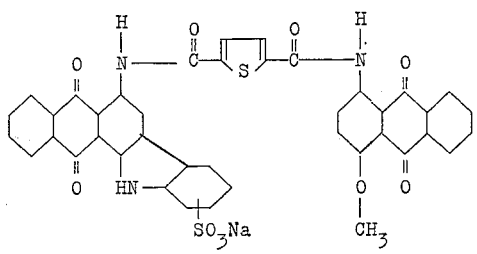

could be isolated by salting out. It dyed cotton violet tints.

Example 4

17.2 parts of 2:5-thiophene-dicarboxylic acid and 26 parts of thionyl chloride were stirred for ½ hour at 125 to 130° C. in 700 parts by volume of trichlorobenzene in the presence of 0.5 part of pyridine. After cooling the reaction mixture to 90° C., 72 parts of 1-amino-5-(3′-carboxyanilido)-anthraquinone were introduced and the batch stirred for 3 hours at 145 to 150° C. After cooling, it was filtered and the filter residue washed with a small amount of trichlorobenzene and with methanol. 10 parts of the violet vat dyestuff so prepared were stirred for 1 hour at 60° C. in 100 parts by volume of 94% sulfuric acid. The batch was cooled, discharged on to ice, filtered, and the filter residue washed with water. The water-soluble dyestuff thus obtained corresponds to the formula

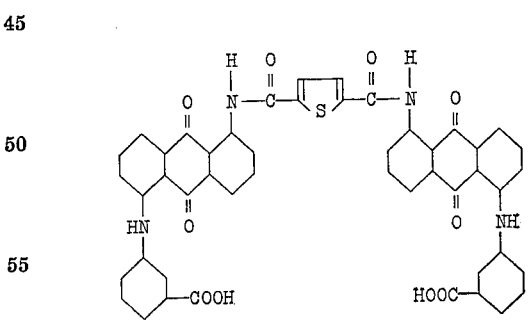

and dyed cotton orange-brown tints.

The 1-amino-5-(3′-carboxyanilido)-anthraquinone could be replaced with equal success by the 1:6-, 1:7- or 1:8-derivatives. The corresponding 1:4-derivative led to the production of a violet water-soluble vat dyestuff.

The corresponding 4′-carboxyanilido compounds gave dyestuffs having similar properties.

The thiophene-dicarboxylic acid could be replaced by one of the dicarboxylic acids corresponding to the dichlorides listed in the table in Example 1; dyestuffs having similar properties were formed.

Example 5

10 parts of the dyestuff of the formula

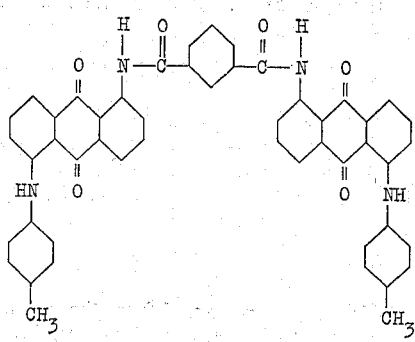

prepared by acylating 2 mols of 1-amino-5-(para-toluidino)-anthraquinone with 1 mol of isophthalic acid dichloride were sprinkled at room temperature into 50 parts by volume of 90% sulfuric acid and the solution stirred until no further change in color took place. The solution was discharged on to ice and the dyestuff isolated by filtration, washed with water and dried.

5 parts of the brown dyestuff thus prepared which corresponded to the formula

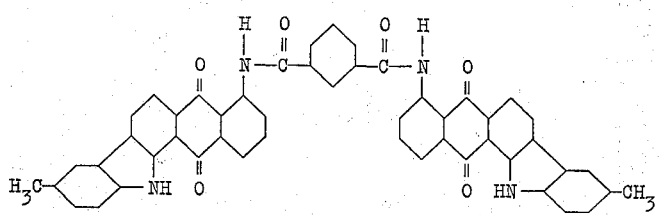

were sprinkled at room temperature into 35 parts by volume of oleum containing 15% of free $SO_3$ and the batch stirred until a neutralized test portion was soluble in water. After the usual processing, the dyestuff obtained dyed cotton orange-brown tints when applied by the vat dyeing method.

This dyestuff corresponded in all respect to the one produced in the manner described in the following Example 6.

The isophthalic acid dichloride could be replaced by one of the dichlorides listed in the table in Example 1; dyestuffs having similar properties were obtained.

Example 6

10 parts of the dystuff of the formula

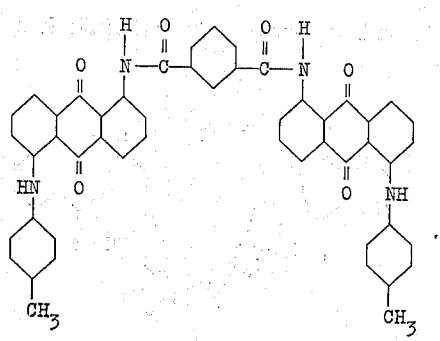

prepared by acylating 2 mols of 1-amino-5-(para-toluidino)-anthraquinone with 1 mol of isophthalic acid dichloride were sprinkled at room temperature into 100 parts by volume of monohydrate and the batch stirred until a neutralized test portion was soluble in water. Sulfonation and carbazolization, which took place simultaneously, were complete after about 3 hours. The solution was discharged on to 400 parts of ice, the precipitate isolated by filtration and then washed with a dilute sodium chloride solution. The dyestuff obtained of the formula

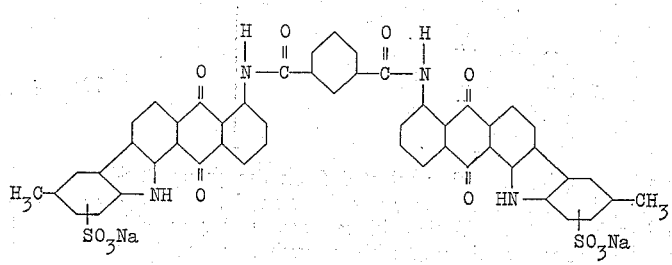

dyed cotton orange-brown tints when applied by the vat dyeing method.

Example 7

16.8 parts of 1-benzoylamino-5-anilidoanthraquinone were sprinkled at room temperature into 100 parts by volume of monohydrate and the batch stirred until a neutralized test portion was soluble in water. 12 parts of water were slowly added to the solution which was then stirred for 1 hour at 100° C. After cooling, the solution was discharged on to 600 parts of ice, the precipitate isolated by filtration, washed with dilute sodium chloride solution until the washings ran neutral and then dried.

7.8 parts of the carbazole thus prepared and which corresponded to the formula

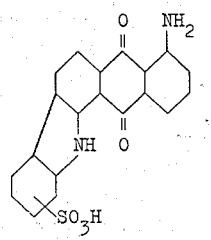

together with 2 parts of isophthalic acid chloride were stirred in 75 parts by volume of tetra-hydrothiophene-S-dioxide ("Sulfolan") at 170° C. in the presence of 0.1 part of pyridine until acylation was complete. After cooling, the precipitate was isolated by filtration, washed first with a small amount of "Sulfolan," then thoroughly washed with alcohol and dried. The yellow-brown dyestuff thus obtained corresponded to the product obtained as described in the first and second paragraphs of Example 1.

*Dyeing prescription.*—0.15 part of the dyestuff obtained in the manner described in Example 1 were introduced into 50 parts of water and the mixture poured into a solution having a temperature of 60° C. comprising 2 parts by volume of sodium hydroxide solution (36° Bé.) and 1.2 parts of hydrosulfite in 350 parts of water. 10 parts of cotton were dyed for 45 minutes in the dyebath thus prepared in the presence of 12 parts of sodium chloride, the dyeing temperature being raised to 80° C. After dyeing, the cotton was rinsed in cold running water, oxidized, acidified and then soaped at the boil.

What is claimed is:

1. An anthraquinone vat dyestuff of the formula

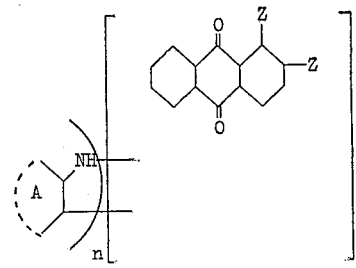

in which A is a member selected from the group consisting of benzene, toluene, chlorobenzene, benzene sulfonic acid, toluene sulfonic acid, benzene carboxylic acid, toluene carboxylic acid, naphthalene, naphthalene sulfonic acid and naphthalene carboxylic acid, $n$ is a positive whole number of at most 2, one Z is hydrogen and the other Z is a group of the formula —NH—$R_1$—NH—X, in which $R_1$ is the radical of an at least dibasic carboxylic acid bound to the —NH-bridges via its carbonyl groups and selected from the group consisting of an aliphatic dicarboxylic acid containing at most 4 carbon atoms, an aromatic dicarboxylic acid of the benzene series, an aromatic dicarboxylic acid of the naphthalene series and a heterocyclic dicarboxylic acid containing an at least 5-membered and an at most 6-membered heterocyclic ring, and X represents a vattable anthraquinone radical containing at most 6 fused rings, and in which anthraquinone vat dyestuff the radical A is bound in ortho-position through both valencies to the same six-membered ring of the anthraquinone nucleus and in which at least one external aryl radical contains a sulfonic acid or carboxylic acid group.

2. An anthraquinone vat dyestuff of the formula

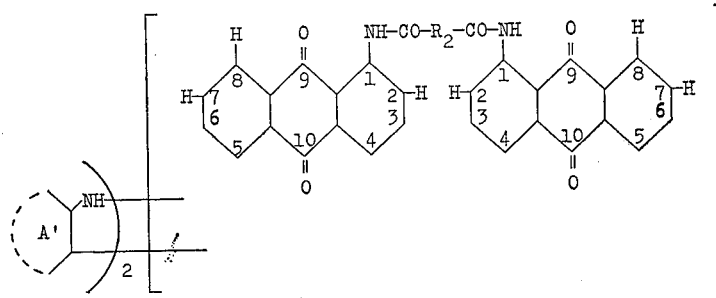

in which $R_2$ is a member selected from the group consisting of benzene, naphthalene, diphenylene, diphenyloxide, diphenylsulfide, diphenylamine, diphenylmethane, azobenzene, azodiphenylene, furane, diphenoloxdiazole, thiophene, pyridine, dibenzodioxane and dibenzodithiane, A' is a member selected from the group consisting of benzene sulfonic acid and naphthalene sulfonic acid, and in which anthraquinone vat dyestuff the two radicals

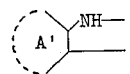

are symmetrically bound to the two 9:10-dioxoanthracene radicals, the —NH— bridge being attached to one of the positions 4 and 5, and the direct linkage being attached in ortho position to the —NH— bridge.

3. An anthraquinone vat dyestuff of the formula

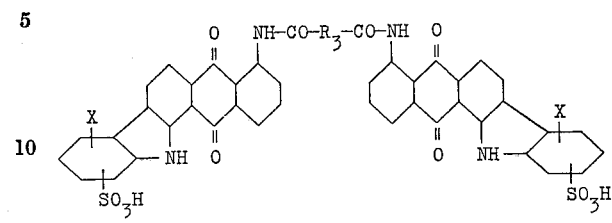

in which $R_3$ is a member selected from the group consisting of benzene and thiophene and X is a member selected from the group consisting of hydrogen and lower alkyl.

4. An anthraquinone vat dyestuff of the formula

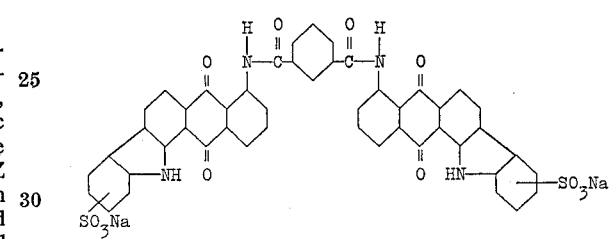

5. An anthraquinone vat dyestuff of the formula

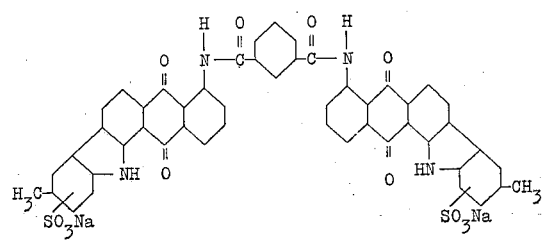

6. An anthraquinone vat dyestuff of the formula

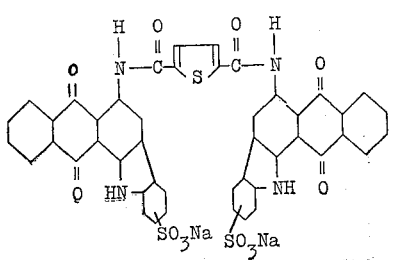

7. An anthraquinone vat dyestuff of the formula
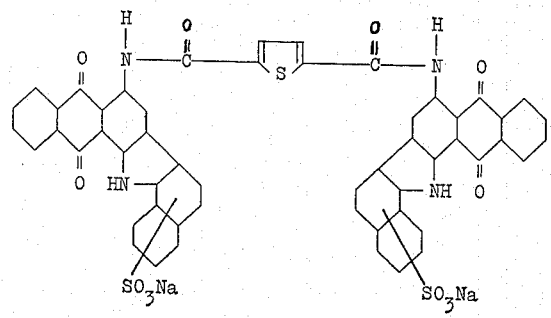
8. An anthraquinone vat dyestuff of the formula
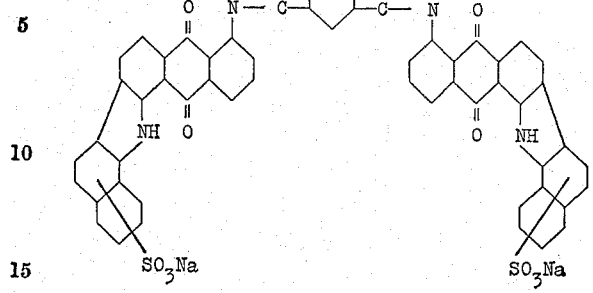
References Cited
UNITED STATES PATENTS
2,903,450   9/1959   Long et al. _____ 260—316
WALTER A. MODANCE, *Primary Examiner.*
JOHN M. FORD, *Assistant Examiner.*